US012781943B2

(12) United States Patent
Totsuka et al.

(10) Patent No.: US 12,781,943 B2
(45) Date of Patent: Nov. 3, 2026

(54) DRAWING LAMP

(71) Applicant: KOITO MANUFACTURING CO., LTD., Tokyo (JP)

(72) Inventors: Takahiro Totsuka, Shizuoka (JP); Norihiko Kobayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 19/117,741

(22) PCT Filed: Nov. 7, 2023

(86) PCT No.: PCT/JP2023/040010

§ 371 (c)(1),
(2) Date: Apr. 2, 2025

(87) PCT Pub. No.: WO2024/111399

PCT Pub. Date: May 30, 2024

(65) Prior Publication Data

US 2026/0126160 A1 May 7, 2026

(30) Foreign Application Priority Data

Nov. 22, 2022 (JP) ................................ 2022-186955

(51) Int. Cl.
*F21S 43/00* (2018.01)
*B60Q 1/00* (2006.01)
(Continued)

(52) U.S. Cl.
CPC .......... *F21S 43/601* (2024.05); *B60Q 1/0041* (2013.01); *B60Q 1/38* (2013.01); (Continued)

(58) Field of Classification Search
CPC ................................................ B60Q 2400/50
See application file for complete search history.

(56) References Cited

U.S. PATENT DOCUMENTS

| | | | | |
|---|---|---|---|---|
| 10,386,043 B1 * | 8/2019 | Lim | ....................... | B60Q 1/085 |
| 2016/0161076 A1 * | 6/2016 | Shibata | .................. | F21S 41/26 362/543 |

(Continued)

FOREIGN PATENT DOCUMENTS

| | | |
|---|---|---|
| CN | 111911881 A | 11/2020 |
| EP | 3401161 A2 | 11/2018 |

(Continued)

OTHER PUBLICATIONS

International Search Report dated Dec. 26, 2023 filed in PCT/JP2023/040010; 6 pages.

(Continued)

*Primary Examiner* — Eric T Eide
(74) *Attorney, Agent, or Firm* — Rankin, Hill & Clark LLP

(57) ABSTRACT

In a drawing lamp configured to form a drawing light distribution pattern, it is possible to form the drawing light distribution pattern without giving discomfort to the surroundings. Light is emitted from a drawing unit 20 to a lamp front via a translucent cover 14. In this case, a reflecting mirror 40 that reflects the light emitted from the drawing unit 20 downward is disposed between the drawing unit 20 and the translucent cover 14. In addition, the reflecting mirror 40 is disposed at a position overlapping with a light emitting region A of the drawing unit 20 in an up-down direction. As a result, it is possible to effectively reduce light emission from the drawing unit 20 itself from being visually recognized when a drawing lamp 10 is ON and to prevent unnecessary discomfort from being given to other vehicles, pedestrians, and the like.

15 Claims, 13 Drawing Sheets

(51) Int. Cl.

| | |
|---|---|
| ***B60Q 1/38*** | (2006.01) |
| ***F21S 43/14*** | (2018.01) |
| ***F21S 43/20*** | (2018.01) |
| ***F21S 43/31*** | (2018.01) |
| ***F21S 43/40*** | (2018.01) |
| ***F21W 103/20*** | (2018.01) |
| ***F21W 103/60*** | (2018.01) |

(52) U.S. Cl.
CPC ......... *F21S 43/14* (2018.01); *F21S 43/26231* (2024.05); *F21S 43/265* (2024.05); *F21S 43/31* (2018.01); *F21S 43/401* (2024.05); *B60Q 2400/50* (2013.01); *F21W 2103/20* (2018.01); *F21W 2103/60* (2018.01)

(56) References Cited

U.S. PATENT DOCUMENTS

| | | | | |
|---|---|---|---|---|
| 2017/0067609 | A1 | 3/2017 | Ichikawa et al. | |
| 2017/0072839 | A1 | 3/2017 | Schmidt et al. | |
| 2017/0337821 | A1* | 11/2017 | Masuda | B60Q 1/26 |
| 2019/0113197 | A1* | 4/2019 | Kamiya | F21S 43/14 |
| 2020/0406845 | A1* | 12/2020 | Sonoda | B60R 19/50 |
| 2021/0347294 | A1* | 11/2021 | Mochizuki | G08G 1/166 |
| 2022/0402424 | A1* | 12/2022 | Park | F21S 41/675 |
| 2022/0410793 | A1 | 12/2022 | Jiang et al. | |
| 2023/0041578 | A1 | 2/2023 | Hamamoto et al. | |

FOREIGN PATENT DOCUMENTS

| | | | |
|---|---|---|---|
| JP | 2015164828 | A | 9/2015 |
| JP | 2015-201296 | A | 11/2015 |
| JP | 2016-192299 | A | 11/2016 |
| JP | 2018-063923 | | 4/2018 |
| JP | 2019-006366 | | 1/2019 |
| JP | 2022-060057 | A | 4/2022 |
| JP | 2022-060067 | | 4/2022 |
| JP | 2022-146752 | | 10/2022 |
| KR | 10-2012-0100528 | A | 9/2012 |
| WO | 2014207414 | A2 | 12/2014 |
| WO | 2021/172134 | | 9/2021 |
| WO | 2021196489 | A1 | 10/2021 |

OTHER PUBLICATIONS

EESR issued on Feb. 18, 2026 for the corresponding EP Patent Application No. 23894411.0, 8 pages.

* cited by examiner

DRAWING LAMP

TECHNICAL FIELD

The invention of the present application relates to a drawing lamp configured to form a drawing light distribution pattern.

BACKGROUND ART

Conventionally, as a drawing lamp for forming a drawing light distribution pattern (i.e., light distribution pattern for drawing a character, a symbol, or the like on a lamp front road surface or the like), there has been known a drawing lamp configured to emit light from a drawing unit to a lamp front through a translucent cover.

"Patent Literature 1" describes a vehicle-mounted drawing lamp mounted on a vehicle in a state in which a drawing unit is disposed in an obliquely downward posture.

CITATION LIST

Patent Literature

Patent Literature 1: JP-A-2022-60057

SUMMARY OF INVENTION

Problems to be Solved by Invention

By forming the drawing light distribution pattern by the light emitted from such an in-vehicle drawing lamp, it is possible to indicate own vehicle's intention to the surroundings, e.g., during traveling of the vehicle at night, and therefore, it is possible to call attention to other vehicles, pedestrians, and the like.

However, it may be undesirable if light emission from the drawing unit itself is visually recognized when the drawing lamp is ON. For example, in a case where the drawing lamp is configured to be turned on in synchronization with ON of a front turn signal lamp, not only light emission from the front turn signal lamp is visually recognized at an original mount position, but also light emission from the drawing unit is also visually recognized at another position. For this reason, this may give discomfort to other vehicles, pedestrians, and the like.

The invention of the present application has been made in view of such circumstances, and an object thereof is to provide a drawing lamp capable of forming a drawing light distribution pattern without giving discomfort to the surroundings.

Solution to Problems

The invention of the present application achieves the above-described object by a configuration including a predetermined reflecting mirror.

That is, the drawing lamp according to the invention of the present application is

- a drawing lamp configured to form a drawing light distribution pattern on a lamp front road surface by emitting light from a drawing unit to a lamp front via a translucent cover, which includes
- a reflecting mirror disposed between the drawing unit and the translucent cover to reflect the light from the drawing unit downward.

The reflecting mirror is disposed at a position overlapping with a light emitting region of the drawing unit in an up-down direction.

The "drawing lamp" may be an in-vehicle lamp or a lamp used for applications other than in-vehicle applications.

A specific configuration of the "drawing unit" is not particularly limited as long as the drawing light distribution pattern can be formed by the emitted light.

As long as the "reflecting mirror" is configured to reflect the light emitted from the drawing unit downward in a state of being disposed between the drawing unit and the translucent cover, a specific configuration such as the direction and shape of a reflecting surface thereof is not particularly limited.

Specific arrangement and size of the "reflecting mirror" are not particularly limited as long as the reflecting mirror is disposed at the position overlapping with the light emitting region of the drawing unit in the up-down direction.

Effects of Invention

The drawing lamp according to the invention of the present application is configured to form the drawing light distribution pattern on the lamp front road surface by emitting the light from the drawing unit to the lamp front via the translucent cover. However, the reflecting mirror that reflects the light emitted from the drawing unit downward is disposed between the drawing unit and the translucent cover, and the reflecting mirror is disposed at the position overlapping with the light emitting region of the drawing unit in the up-down direction. Thus, it is possible to effectively reduce visual recognition of light emission from the drawing unit itself when the drawing lamp is ON. This can prevent, when the drawing lamp is ON, unnecessary discomfort from being given to other vehicles, pedestrians, and the like.

As described above, according to the invention of the present application, in the drawing lamp configured to form the drawing light distribution pattern, it is possible to form the drawing light distribution pattern without giving discomfort to the surroundings.

In addition, in the configuration above, as the reflecting surface of the reflecting mirror, a plurality of reflecting regions is arranged side by side in a lamp front-rear direction, and the plurality of reflecting regions is configured such that an inclination angle with respect to the horizontal plane is set to a smaller value as the reflecting region is located on the lamp front side. Thus, a plurality of drawing light distribution patterns can be formed in series on the lamp front road surface by the light emitted from the single drawing unit, whereby a function of calling attention to the surroundings can be enhanced.

In this case, the reflecting surface of the reflecting mirror is formed such that the inclination angle gradually changes in a boundary region between the plurality of reflecting regions, so that the drawing light distribution pattern can be formed as a series of light distribution patterns extending from a near region to a far region of the lamp front road surface.

In the configuration above, the reflecting mirror is configured to turn about an axis extending in the horizontal direction, so that the formation position of the drawing light distribution pattern on the lamp front road surface can be changed in the lamp front-rear direction by turning the reflecting mirror.

In this case, a frame for blocking part of the reflected light from the reflecting mirror to regulate an irradiation area is formed at a front end portion of the reflecting mirror, so that it is possible to prevent stray light other than the original irradiation light from being emitted from the drawing unit to the lamp front via the translucent cover in advance, whereby the drawing light distribution pattern can be clearly formed. In addition, since the frame turns together with the reflecting mirror, the stray light can be blocked without blocking the original irradiation light.

In the configuration above, further, the translucent cover is formed such that a portion located lower than the reflecting mirror is formed as a recessed portion recessed to a lamp rear side, and is configured to cause the reflected light from the reflecting mirror to penetrate an upper region of the recessed portion. Thus, the following features and effects can be obtained.

That is, in a case where the surface of the translucent cover is dirty, when the light emitted from the drawing unit penetrates the translucent cover, scattered light is generated in such a transmission region, which may give unnecessary discomfort to the surroundings.

On the other hand, by adopting the configuration in which the recessed portion is formed in the translucent cover, dirt is less likely to adhere to the upper region. Thus, by adopting the configuration in which the reflected light from the reflecting mirror penetrates the upper region of the recessed portion, it is possible to effectively reduce the generation of the scattered light and, as a result, to prevent unnecessary discomfort from being given to the surroundings.

In this case, the upper region of the recessed portion is formed in a flat plate shape, so that the light emitted from the drawing unit can penetrate the translucent cover as it is, whereby the drawing light distribution pattern can be accurately formed.

In the configuration above, an extension panel is further disposed between the reflecting mirror and the translucent cover, so that when the drawing lamp is OFF, it is possible to prevent the reflecting mirror and the drawing unit from being visually recognized via the translucent cover, whereby the appearance of the drawing lamp can be improved. Further, when the drawing lamp is ON, it is possible to more effectively reduce visual recognition of light emission from the drawing unit itself.

In this case, the reflecting mirror and the extension panel are integrally formed, so that the above-described features and effects can be obtained without increasing the number of components.

In the configuration above, a region of the translucent cover located in the lamp front of the reflecting mirror is formed of a two-color molded article made of opaque resin, so that it is possible to prevent the reflecting mirror and the drawing unit from being visually recognized via the translucent cover when the drawing lamp is OFF and to achieve this effect without increasing the number of components.

DESCRIPTION OF EMBODIMENTS

Embodiments of the invention of the present application will be described hereinafter with reference to the drawings.

Figure 1:
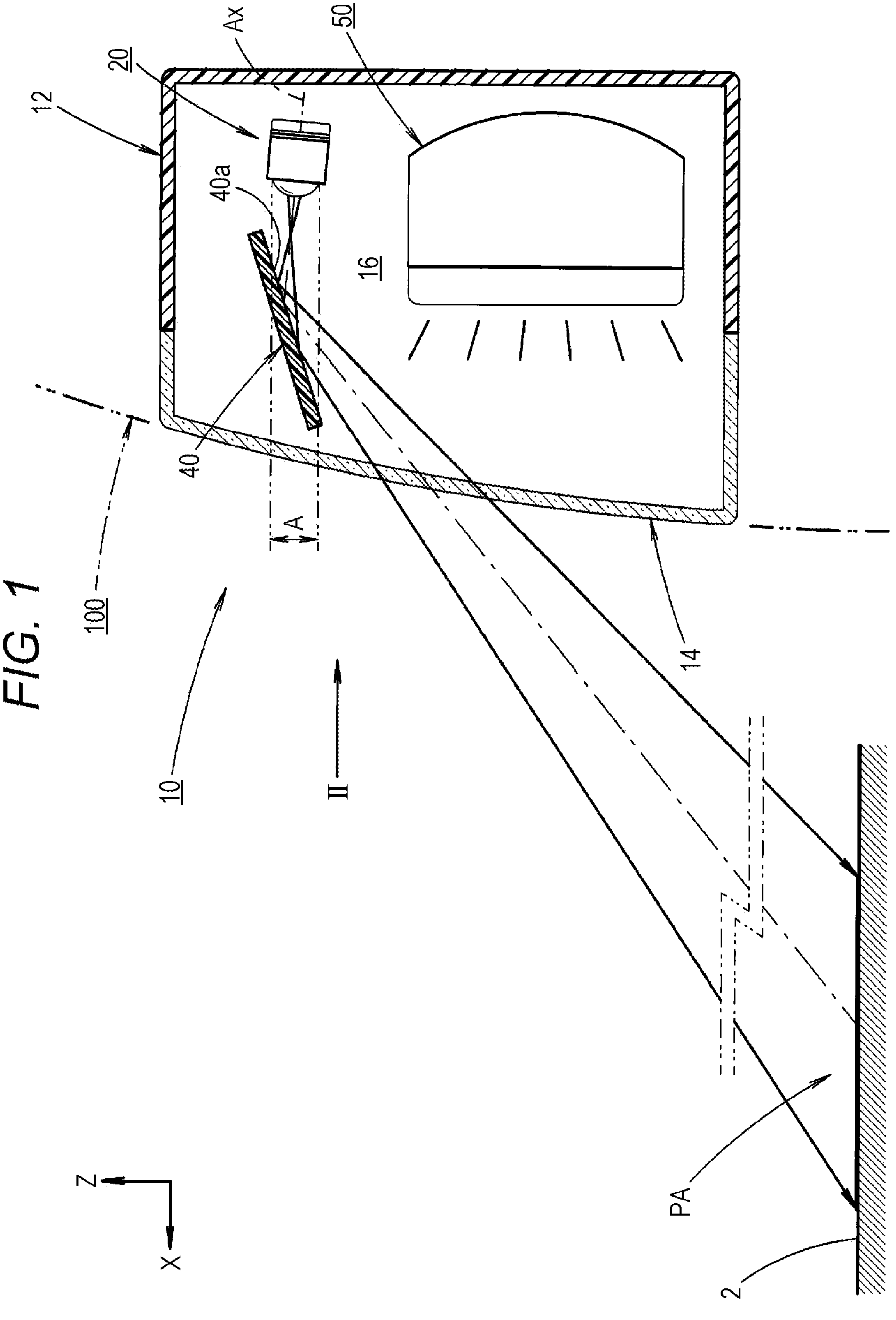
FIG. 1 is a side sectional view showing a drawing lamp according to one embodiment of the invention of the present application.
Figure 2:
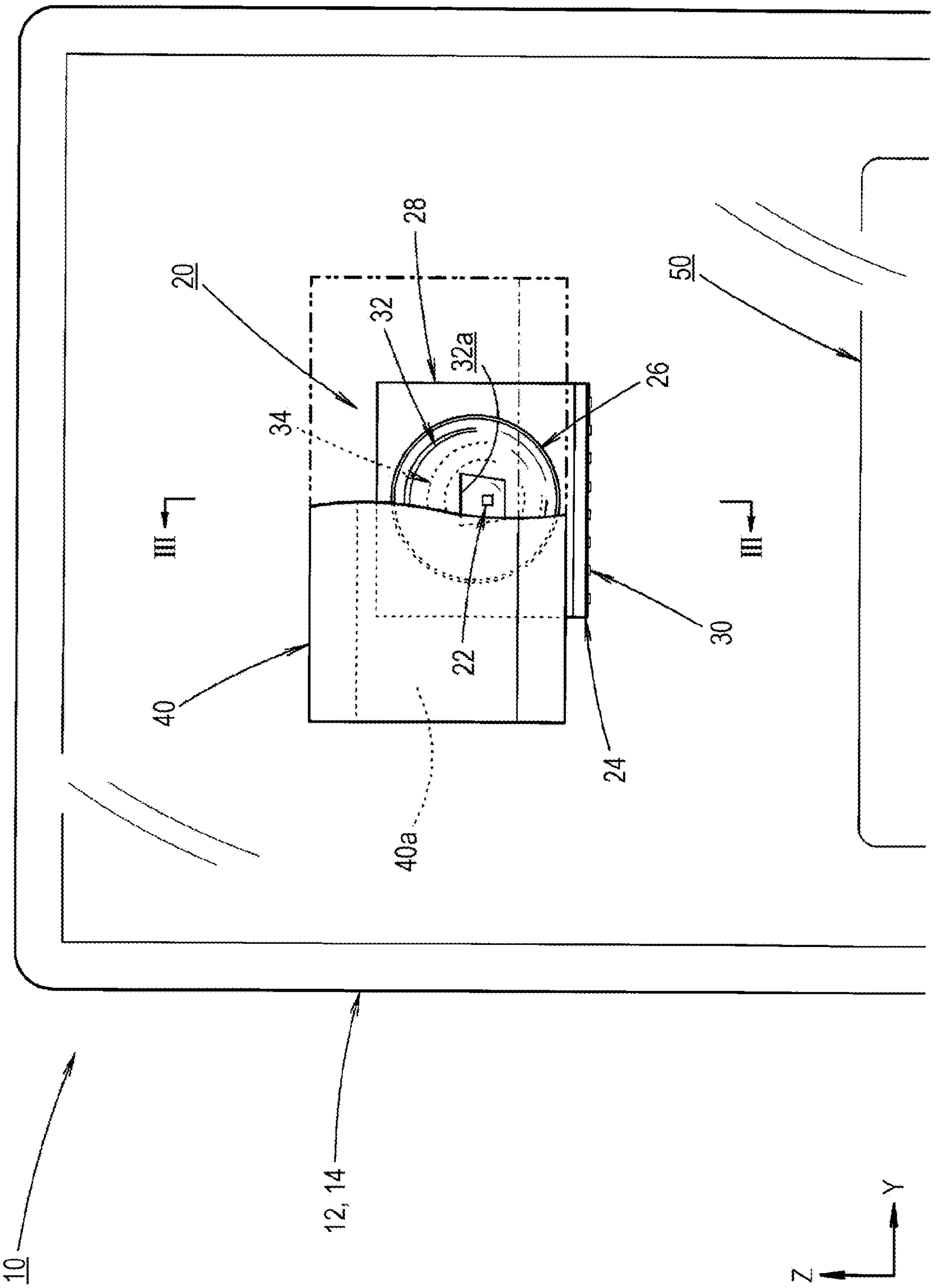
FIG. 2 is a view from a direction II in FIG. 1.

FIG. 1 is a side sectional view showing a drawing lamp 10 according to one embodiment of the invention of the present application. FIG. 2 is a view from a direction II in FIG. 1, and FIG. 3 is a sectional view taken along line III-III in FIG. 2.

Figure 3:
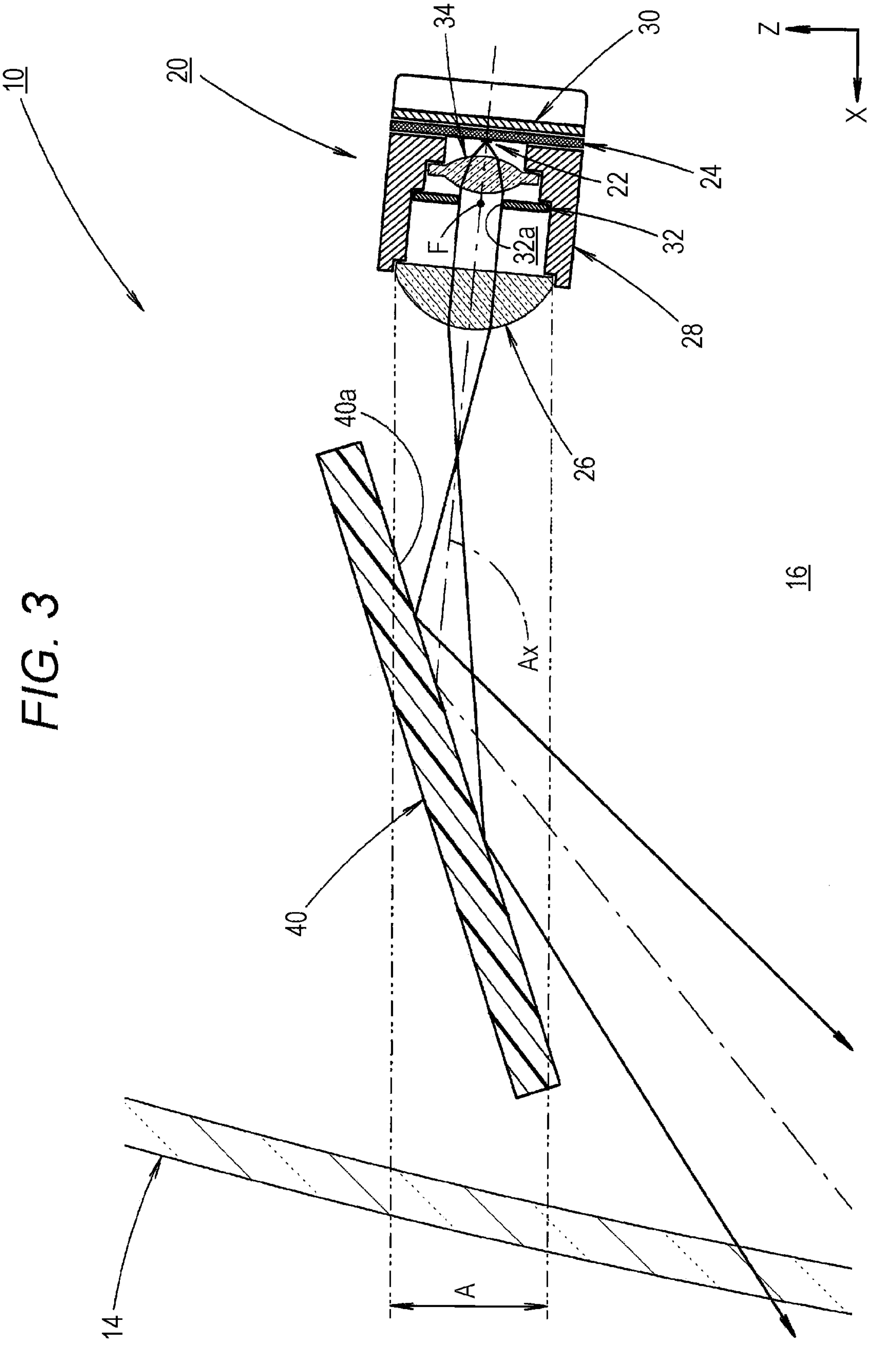
FIG. 3 is a sectional view taken along line III-III in FIG. 2.

In FIGS. 1 to 3, a direction represented by X is a "lamp front", a direction represented by Y is a "left direction" ("right direction" when viewed from the front of the lamp) perpendicular to the "lamp front", and a direction represented by Z is an "up direction". The same also applies to figures other than FIGS. 1 to 3.

As shown in FIG. 1, the drawing lamp 10 is configured such that a drawing unit 20 and a reflecting mirror 40 are housed in a lamp chamber 16 formed by a lamp body 12 and a translucent cover 14 attached to a front end opening of the lamp body 12. A front turn signal lamp 50 is also housed in the lamp chamber 16. In this case, the drawing unit 20 and the reflecting mirror 40 are disposed in an upper region of the lamp chamber 16, and the front turn signal lamp 50 is disposed in a lower region of the lamp chamber 16.

Note that the drawing unit 20 and the reflecting mirror 40 are supported by the lamp body 12 via a support member (not shown), and the front turn signal lamp 50 is also supported by the lamp body 12 via a support member (not shown).

Before a specific configuration of the drawing lamp 10 according to the present embodiment is described, the outline thereof will be described.

Figure 4:
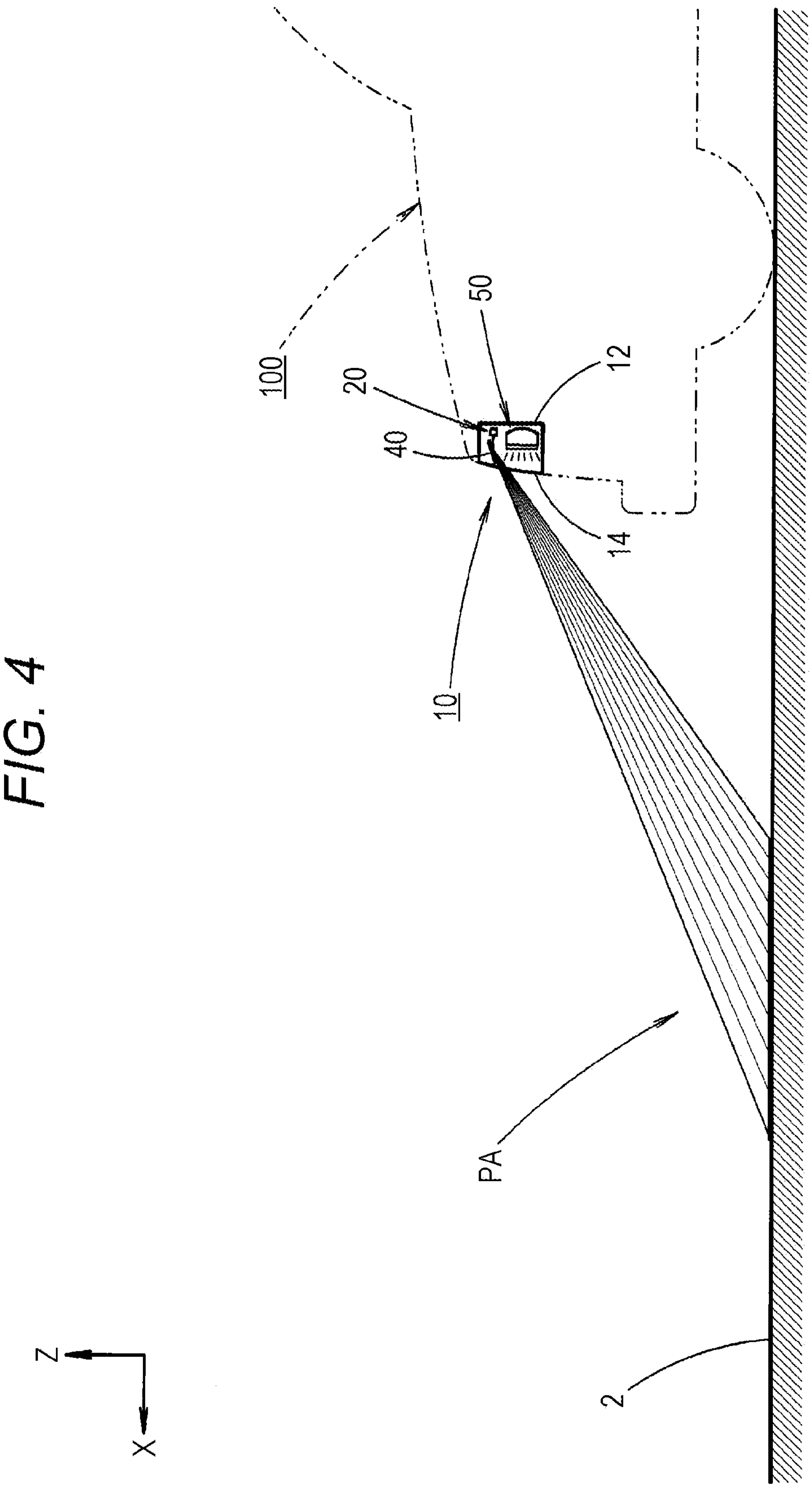
FIG. 4 is a side view showing the drawing lamp mounted on a vehicle.
Figure 5:
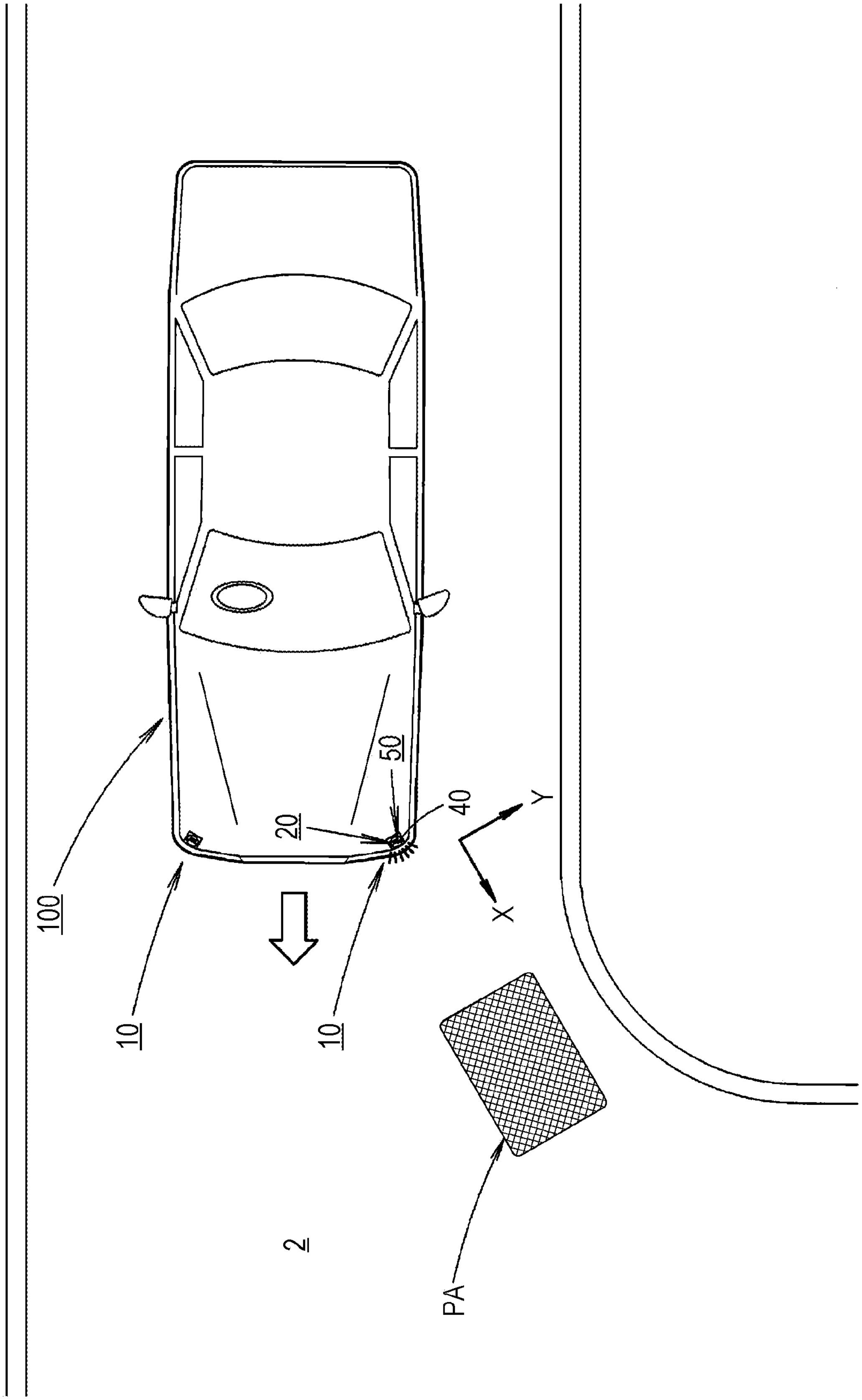
FIG. 5 is a plan view showing the drawing lamp mounted on the vehicle.

FIGS. 4 and 5 are a side view and a plan view showing the drawing lamp 10 mounted on a vehicle 100.

As shown in FIGS. 4 and 5, the drawing lamp 10 is configured to emit light obliquely downward to the outside in a vehicle width direction in a state of being mounted on a side end portion of the vehicle 100 in the vehicle width direction at a front end portion of the vehicle 100. That is, the drawing lamp 10 forms a drawing light distribution pattern PA on a lamp front road surface 2 by emitting light from the drawing unit 20 toward the lamp front via the translucent cover 14. The drawing lamp 10 is configured such that the drawing unit 20 thereof is turned on in synchronization with ON of the front turn signal lamp 50. Note that FIG. 5 shows a state in which the drawing unit 20 and front turn signal lamp 50 of the drawing lamp 10 on the left side are ON.

As shown in FIG. 5, in a state in which the drawing lamp 10 is mounted on the vehicle 100, the lamp front is set in a direction inclined outward in the vehicle width direction with respect to a vehicle front-rear direction.

Next, a specific configuration of the drawing lamp 10 will be described.

As shown in FIG. 1, the translucent cover 14 of the drawing lamp 10 is formed so as to extend in a convex curved shape along the surface shape of the vehicle 100.

In the drawing lamp 10, the light emitted from the drawing unit 20 is reflected downward by the reflecting mirror 40 disposed between the drawing unit 20 and the translucent cover 14. At this time, the reflecting mirror 40 is disposed at a position overlapping with a light emitting region A (described later) of the drawing unit 20 in an up-down direction.

As shown in FIG. 3, the drawing unit 20 is configured to emit light from a light emitting element 22 to the lamp front via a projection lens 26 such that the light enters the reflecting mirror 40.

The projection lens 26 is a plano-convex lens of which the front surface is a convex curved surface, and is supported by a lens holder 28 in a state in which the optical axis Ax is thereof is disposed so as to extend slightly upward to the lamp front.

The light emitting element 22 is a white light emitting diode, and is supported by a substrate 24 extending along a plane perpendicular to the optical axis Ax in a state of being disposed on the optical axis Ax. The substrate 24 is supported by a heat sink 30, and the substrate 24 and the heat sink 30 are supported by the lens holder 28, A light shielding plate 32 for shielding part of light from the light emitting element 22 to the projection lens 26 is disposed between the light emitting element 22 and the projection lens 26. The light shielding plate 32 is supported by the lens holder 28 in a state of being disposed so as to extend along a plane perpendicular to the optical axis Ax at the rear focal point F of the projection lens 26. The light shielding plate 32 is formed with an inverted trapezoidal opening 32*a* centered on the optical axis Ax.

A condenser lens 34 is disposed between the substrate 24 and the light shielding plate 32. The condenser lens 34 is a biconvex lens, and is supported by the lens holder 28 at a peripheral flange portion thereof in a state in which the optical axis thereof is disposed coaxially with the optical axis Ax. The condenser lens 34 is configured to cause light from the light emitting element 22 to enter the opening 32*a* of the light shielding plate 32 as light parallel with the optical axis Ax.

The reflecting mirror 40 is a plane mirror, and has a rectangular outer shape with a right-left width greater than that of the drawing unit 20. The reflecting mirror 40 is disposed in a state in which a reflecting surface 40*a* thereof extends obliquely upward to the lamp rear. As a result, the reflecting mirror 40 regularly reflects light from the drawing unit 20 on the reflecting surface 40*a* obliquely downward to the lamp front.

As described above, since the reflecting mirror 40 is disposed at the position overlapping with the light emitting region A of the drawing unit 20 in the up-down direction, the drawing lamp 10 is configured such that light emission from the drawing unit 20 cannot be visually recognized when viewed from the front of the lamp.

That is, the drawing unit 20 is originally configured such that only light having entered the projection lens 26 as parallel light via the opening 32*a* of the light shielding plate 32 out of light emitted from the light emitting element 22 is emitted to the lamp front, but part of the light emitted from the light emitting element 22 may become stray light and enter the projection lens 26. Thus, as indicated by a two-dot chain line in FIG. 3, the entire region located inside the outer peripheral edge of the projection lens 26 is the light emitting region A of the drawing unit 20, which is the maximum area from which light can be emitted.

Thus, the drawing lamp 10 is configured such that the reflecting mirror 40 is disposed at the position overlapping with the light emitting region A of the drawing unit 20 in the up-down direction, so that light emission from the drawing unit 20 cannot be visually recognized when viewed from the front of the lamp.

Next, the drawing light distribution pattern PA shown in FIGS. 4 and 5 will be described.

As described above, the drawing light distribution pattern PA is formed by the light emitted from the drawing lamp 10, and this drawing light distribution pattern PA is formed as a substantially rectangular bright light distribution pattern.

The drawing light distribution pattern PA is formed as the substantially rectangular light distribution pattern because the inner peripheral edges of the opening 32*a* on the left and right sides are formed so as to extend upward in a direction slightly expanding with respect to the vertical direction. The drawing light distribution pattern PA is formed as the bright light distribution pattern because the light emitted from the light emitting element 22 efficiently enters the opening 32*a* of the light shielding plate 32 by the condenser lens 34.

Next, the features of the present embodiment will be described.

The drawing lamp 10 according to the present embodiment is configured to form the drawing light distribution pattern PA on the lamp front road surface 2 by emitting the light from the drawing unit 20 to the lamp front via the translucent cover 14. However, the reflecting mirror 40 that reflects the light emitted from the drawing unit 20 downward is disposed between the drawing unit 20 and the translucent cover 14, and the reflecting mirror 40 is disposed at the position overlapping with the light emitting region A of the drawing unit 20 in the up-down direction. Thus, it is possible to effectively reduce visual recognition of light emission from the drawing unit 20 itself when the drawing lamp 10 is ON.

That is, the drawing lamp 10 according to the present embodiment is configured such that the drawing unit 20 is turned on in synchronization with ON of the front turn signal lamp 50, but at this time, it is possible to visually recognize only light emission from the front turn signal lamp 50 without visually recognizing light emission from the drawing unit 20. This can prevent, when the drawing lamp 10 is ON, unnecessary discomfort from being given to other vehicles, pedestrians, and the like, As described above, according to the present embodiment, in the drawing lamp 10 configured to form the drawing light distribution pattern PA, it is possible to form the drawing light distribution pattern PA without giving discomfort to the surroundings.

At that time, in the present embodiment, the drawing light distribution pattern PA is formed as the inverted projection image of the opening 32*a* formed in the light shielding plate 32, but since the opening 32*a* has the inverted trapezoidal opening shape, the substantially rectangular drawing light distribution pattern PA can be formed.

In the above-described embodiment, it has been described that the reflecting mirror 40 has the rectangular outer shape, but the reflecting mirror 40 may have an outer shape other than this shape.

In the above-described embodiment, it has been described that the opening 32*a* formed in the light shielding plate 32 has the inverted trapezoidal opening shape, but the opening 32*a* may have an opening shape (for example, V-shape or opening shape such as a downward arrow shape) other than this shape.

In the above-described embodiment, it has been described that the light emitted from the light emitting element 22 enters the opening 32*a* of the light shielding plate 32 via the condenser lens 34, but the light may directly enter the opening 32*a*.

In the above-described embodiment, it has been described that the color of the light emitted from the light emitting element 22 is white, but other colors (for example, amber, red, and the like) other than this color may be adopted.

In the above-described embodiment, it has been described that the drawing lamp 10 is mounted on the side end portion of the vehicle 100 in the vehicle width direction at the front end portion of the vehicle 100. However, it may be configured such that the drawing lamp 10 is mounted on a rear end portion, a side portion, or the like of the vehicle 100.

In the above-described embodiment, it has been described that the drawing light distribution pattern PA is formed on the lamp front road surface 2 by the light emitted from the drawing lamp 10. However, it may be configured such that the drawing light distribution pattern is formed on a wall surface in the lamp front, a wall surface extending to the lamp front, or the like.

Next, modifications of the above-described embodiment will be described.

First, a first modification of the above-described embodiment will be described.

Figure 6:
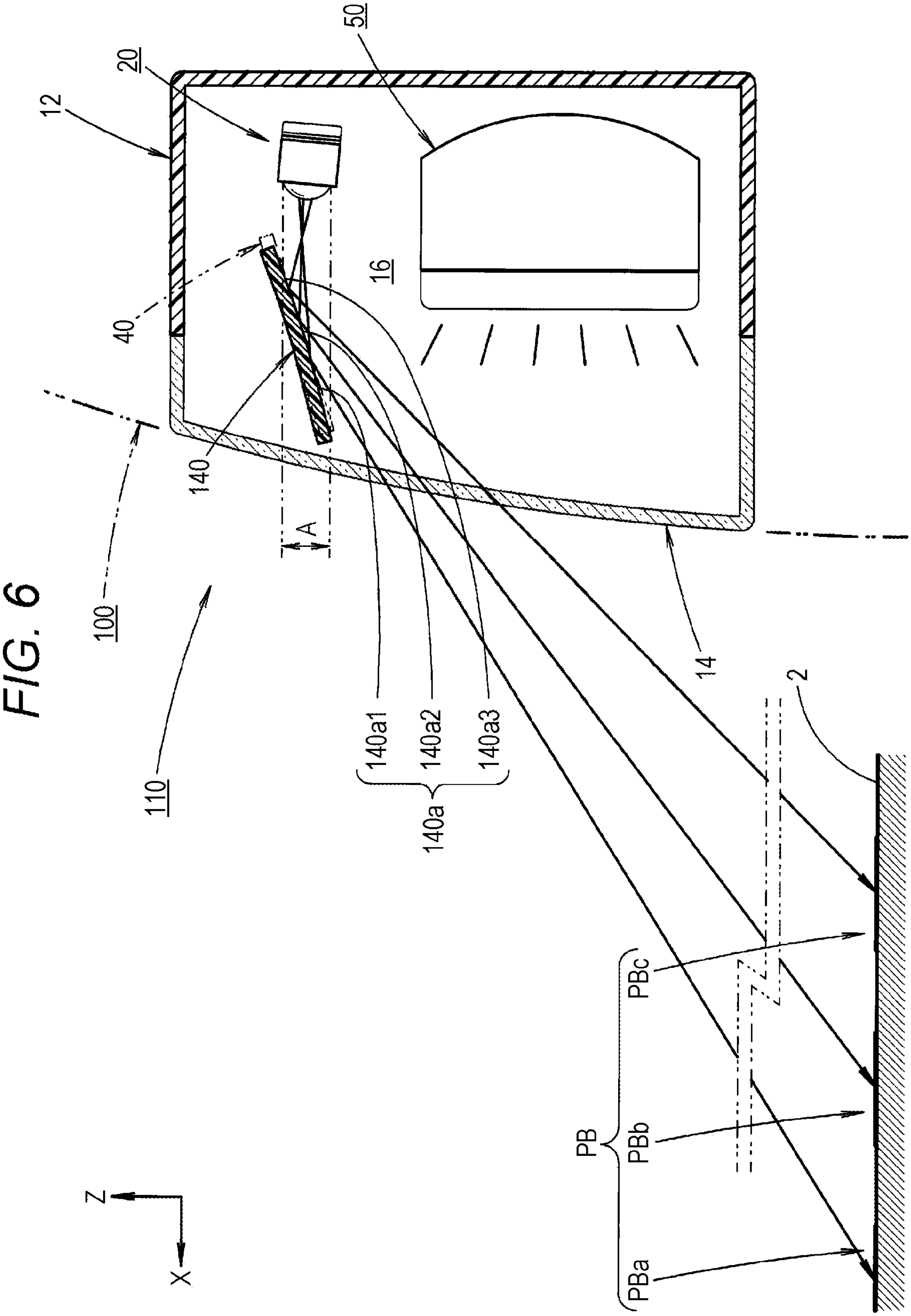
FIG. 6 is a view similar to FIG. 1, which shows a first modification of the embodiment.

FIG. 6 is a view similar to FIG. 1, which shows a drawing lamp 110 according to the present modification.

As shown in FIG. 6, a basic configuration of the present modification is similar to that of the above-described embodiment. However, part of the configuration of a reflecting mirror 140 is different from that of the above-described embodiment.

That is, the reflecting mirror 140 of the present modification is also a plane mirror having a rectangular outer shape with a right-left width greater than that of the drawing unit 20, and is disposed at a position overlapping with the light emitting region A of the drawing unit 20 in the up-down direction.

Also in the reflecting mirror 140 of the present modification, a reflecting surface 140*a* thereof extends obliquely upward to the lamp rear, but the reflecting surface 140 *a* is configured such that three reflecting regions 140*a*1, 140*a*2, 140*a*3 are arranged side by side in the lamp front-rear direction.

Of the three reflecting regions 140*a*1 to 140*a*3, the reflecting region 140*a*1 located closest to the lamp front side is set to have a small inclination angle with respect to the horizontal plane, the reflecting region 140*a*2 adjacent to the lamp rear side thereof is set to have a greater inclination angle with respect to the horizontal plane than that of the reflecting region 140*a*1, and the reflecting region 140*a*3 adjacent to the lamp rear side thereof is set to have a greater inclination angle with respect to the horizontal plane than that of the reflecting region 140*a*2.

In the drawing lamp 110 according to the present modification, the light emitted from the drawing unit 20 is reflected downward by the reflecting mirror 140 to form a drawing light distribution pattern PB including three drawing light distribution patterns PBa, PBb, PBc on the lamp front road surface 2.

Figure 8:
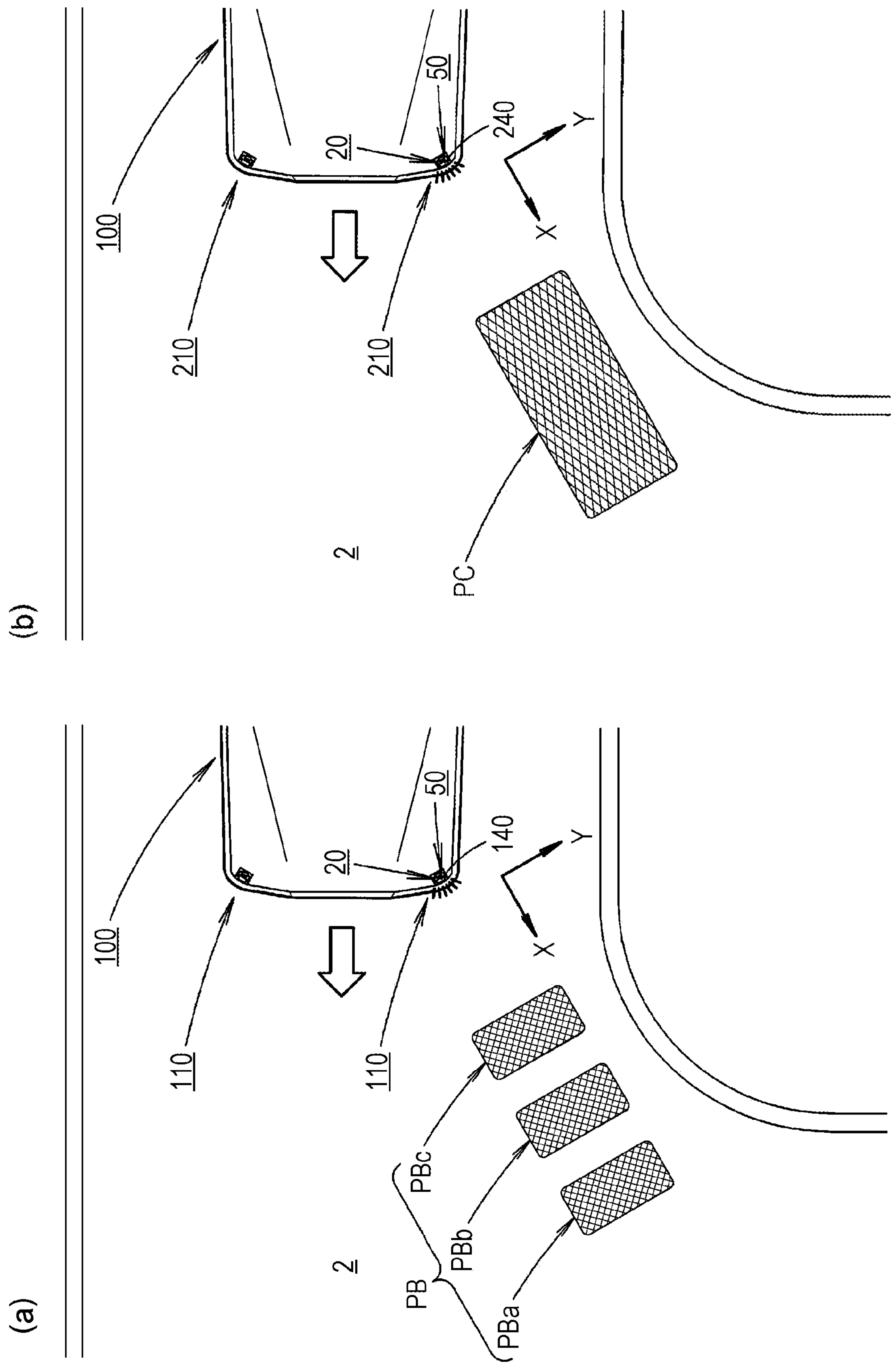
FIG. 8(*a*) is a view similar to FIG. 5, which shows the first modification, and FIG. 8(*b*) is a view similar to FIG. 5, which shows the second modification.

FIG. 8(*a*) is a plan view showing the drawing lamp 110 mounted on the vehicle 100.

As also shown in FIG. 8(*a*), in the drawing light distribution pattern PB, the three drawing light distribution patterns PBa, PBb, PBc are formed in series at intervals. All these three drawing light distribution patterns PBa to PBc are formed as a light distribution pattern having a shorter length in the lamp front-rear direction than that of the drawing light distribution pattern PA formed in the above-described embodiment, but the entire drawing light distribution pattern PB is formed as a light distribution pattern having a longer length in the lamp front-rear direction than that of the drawing light distribution pattern PA.

Also in the present modification, since the reflecting mirror 140 is disposed at the position overlapping with the light emitting region A of the drawing unit 20 in the up-down direction, the drawing light distribution pattern PB can be formed without giving discomfort to the surroundings.

In addition, in the present modification, as the reflecting surface 140*a* of the reflecting mirror 140, the three reflecting regions 140*a*1 to 140*a*3 are arranged side by side in the lamp front-rear direction, and the inclination angle with respect to the horizontal plane is set to a smaller value as the reflecting region is located on the lamp front side. Thus, the three drawing light distribution patterns PB1 to PB3 can be formed in series on the lamp front road surface 2 by the light emitted from the single drawing unit 20, whereby a function of calling attention to the surroundings can be enhanced.

In the first modification above, it has been described that the three reflecting regions 140*a*1 to 140*a*3 are provided as the reflecting surface 140*a* of the reflecting mirror 140, but it may also be configured such that the reflecting surface 140*a* includes two or four or more reflecting regions.

Next, a second modification of the above-described embodiment will be described.

Figure 7:
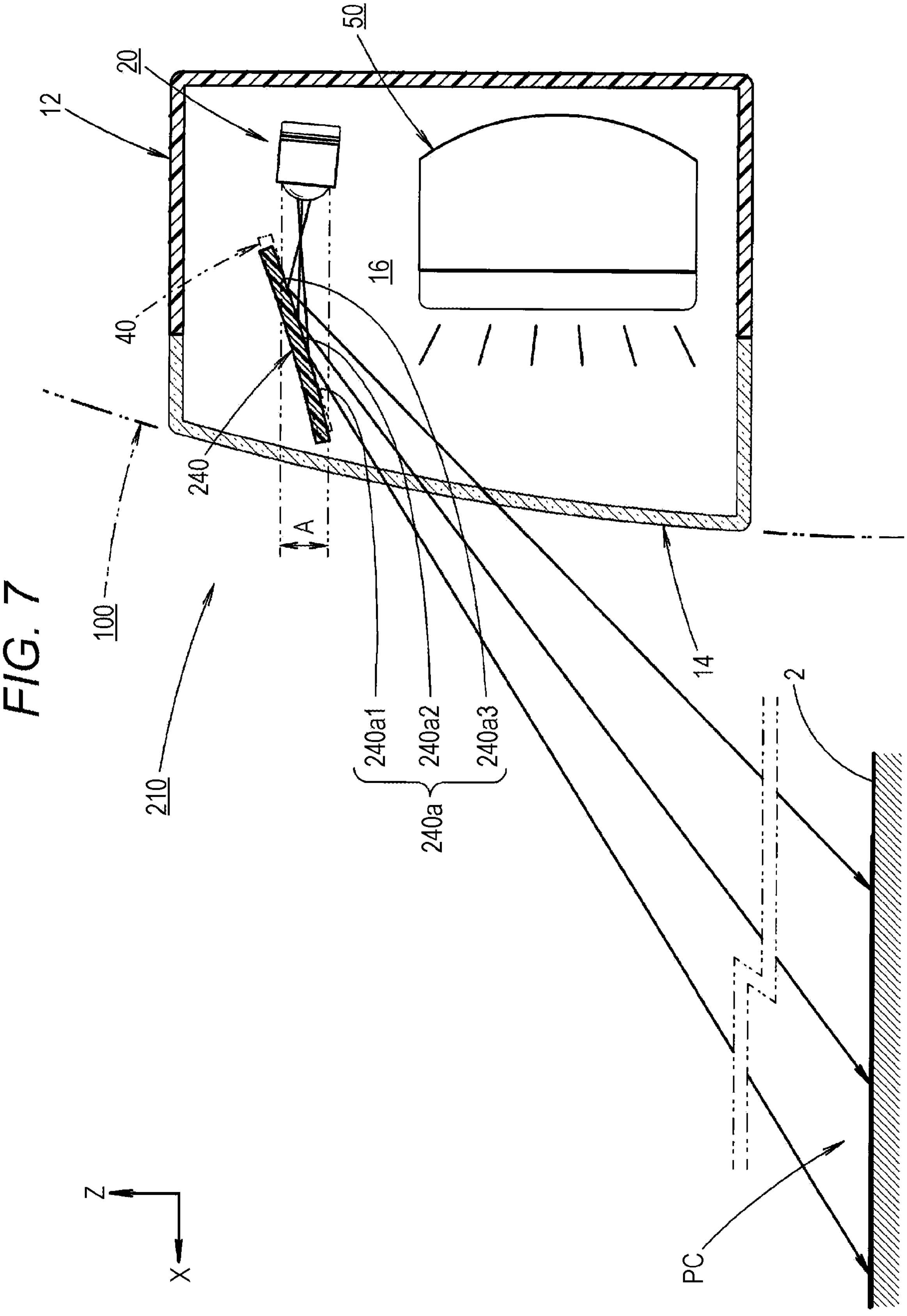
FIG. 7 is a view similar to FIG. 1, which shows a second modification of the embodiment.

FIG. 7 is a view similar to FIG. 1, which shows a drawing lamp 210 according to the present modification.

As shown in FIG. 7, a basic configuration of the present modification is similar to that of the above-described embodiment. However, part of the configuration of a reflecting mirror 240 is different from that of the above-described embodiment.

That is, the reflecting mirror 240 of the present modification is also a plane mirror having a rectangular outer shape with a right-left width greater than that of the drawing unit 20, and is disposed at a position overlapping with the light emitting region A of the drawing unit 20 in the up-down direction.

Also in the reflecting mirror 240 of the present modification, a reflecting surface 240*a* thereof extends obliquely upward to the lamp rear, but the reflecting surface 240*a* is configured such that three reflecting regions 240*a*1, 240*a*2, 240*a*3 are arranged side by side in the lamp front-rear direction.

At this time, the three reflecting regions 240*a*1 to 240*a*3 are formed such that the inclination angle with respect to the horizontal plane gradually increases in this order as in the case of the first modification above, but the inclination angle gradually changes in a boundary region between the three reflecting regions 240*a*1 to 240*a*3, whereby the three reflecting regions 240*a*1 to 240*a*3 are formed in a substantially single convex cylindrical curved shape.

In the drawing lamp 210 according to the present modification, the light emitted from the drawing unit 20 is reflected downward by the reflecting mirror 240 to form a drawing light distribution pattern PC on the lamp front road surface 2.

FIG. 8(*b*) is a plan view showing the drawing lamp 210 mounted on the vehicle 100.

As also shown in FIG. 8(*b*), the drawing light distribution pattern PC is formed as a single light distribution pattern having a longer length in the lamp front-rear direction than that of the drawing light distribution pattern PA formed in the above-described embodiment.

Also in the present modification, since the reflecting mirror 240 is disposed at the position overlapping with the light emitting region A of the drawing unit 20 in the up-down direction, the drawing light distribution pattern PC can be formed without giving discomfort to the surroundings.

Moreover, in the present modification, since the reflecting surface 240*a* of the reflecting mirror 240 is formed such that the inclination angle gradually changes in the boundary region between the three reflecting regions 240*a*1 to 240*a*3, the drawing light distribution pattern PC can be formed as a series of light distribution patterns extending from a near region to a far region of the lamp front road surface, whereby the function of calling attention to the surroundings can be enhanced.

Next, a third modification of the above-described embodiment will be described.

Figure 9:
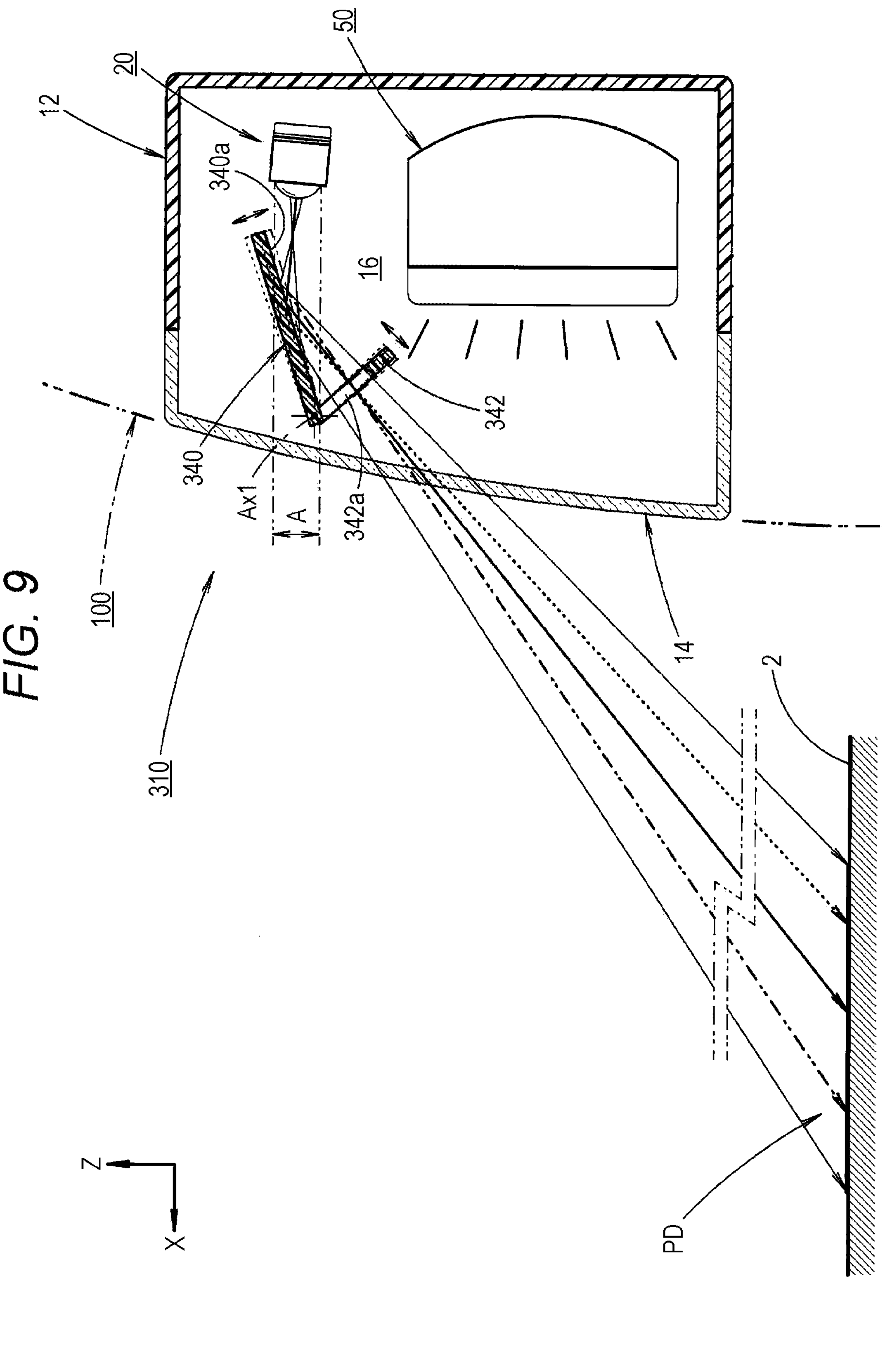
FIG. 9 is a view similar to FIG. 1, which shows a third modification of the embodiment.

FIG. 9 is a view similar to FIG. 1, which shows a drawing lamp 310 according to the present modification.

As shown in FIG. 9, a basic configuration of the present modification is similar to that of the above-described embodiment. However, part of the configuration of a reflecting mirror 340 is different from that of the above-described embodiment.

That is, the reflecting mirror 340 of the present modification is also a plane mirror having a rectangular outer shape with a right-left width greater than that of the drawing unit 20, and is disposed at a position overlapping with the light emitting region A of the drawing unit 20 in the up-down direction.

In the drawing lamp 310 according to the present modification, the light emitted from the drawing unit 20 is reflected downward by the reflecting mirror 340 to form a drawing light distribution pattern PD on the lamp front road surface 2.

The reflecting mirror 340 of the present modification is turnable about an axis Ax1 extending in the horizontal direction at a front end portion thereof. The reflecting mirror 340 is turned about the axis Ax1 by driving of an actuator (not shown). Note that in FIG. 9, a state in which the reflecting mirror 340 has turned upward is indicated by a broken line, and a state in which the reflecting mirror 340 has turned downward is indicated by a two-dot chain line.

In addition, at the front end portion of the reflecting mirror 340 of the present modification, a frame 342 for blocking part of reflected light from a reflecting surface 340*a* to regulate an irradiation area is integrally formed with the reflecting mirror 340. The frame 342 is formed so as to protrude downward from the reflecting mirror 340, and a rectangular opening 342*a* is formed by the frame 342 and the reflecting mirror 340.

Figure 10:
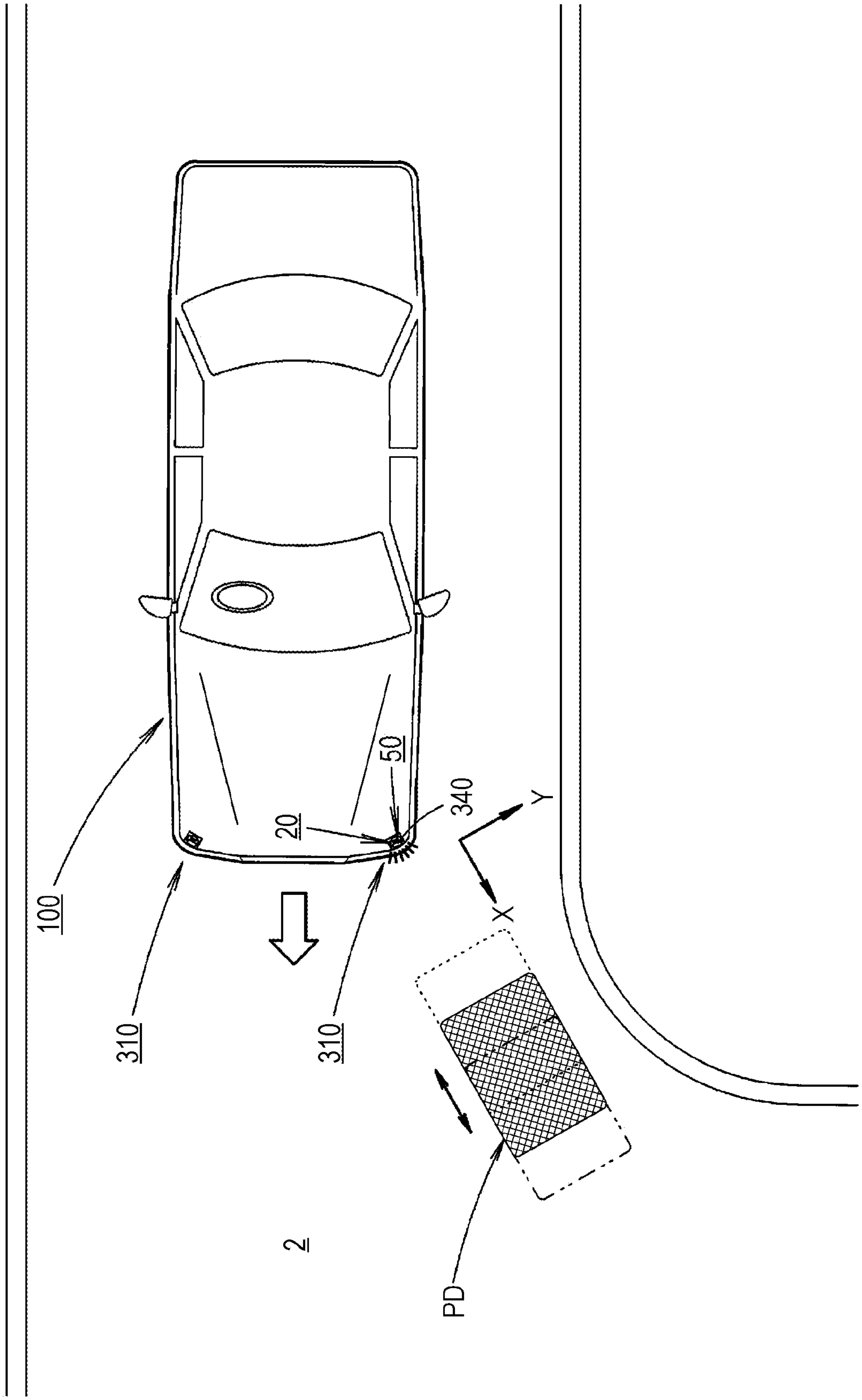
FIG. 10 is a view similar to FIG. 5, which shows the third modification.

FIG. 10 is a plan view showing the drawing lamp 310 mounted on the vehicle 100.

As also shown in FIG. 10, the drawing light distribution pattern PD is formed as a light distribution pattern similar to the drawing light distribution pattern PA formed in the above-described embodiment, but the formation position of the drawing light distribution pattern PD on the lamp front road surface 2 can be changed in the lamp front-rear direction by the turn of the reflecting mirror 340 about the axis Ax1.

Also in the present modification, since the reflecting mirror 340 is disposed at the position overlapping with the light emitting region A of the drawing unit 20 in the up-down direction, the drawing light distribution pattern PD can be formed without giving discomfort to the surroundings.

In addition, in the present modification, by turning the reflecting mirror 340 about the axis Ax1, the formation position of the drawing light distribution pattern PD on the lamp front road surface 2 can be changed in the lamp front-rear direction as necessary.

Further, in the present modification, since the frame 342 is formed at the front end portion of the reflecting mirror 340, it is possible to prevent the stray light other than the original irradiation light from being emitted from the drawing unit 20 to the lamp front via the translucent cover 14 in advance, whereby the drawing light distribution pattern PD can be clearly formed. In addition, since the frame 342 turns together with the reflecting mirror 340, the stray light can be blocked without blocking the original irradiation light.

Next, a fourth modification of the above-described embodiment will be described.

Figure 11:
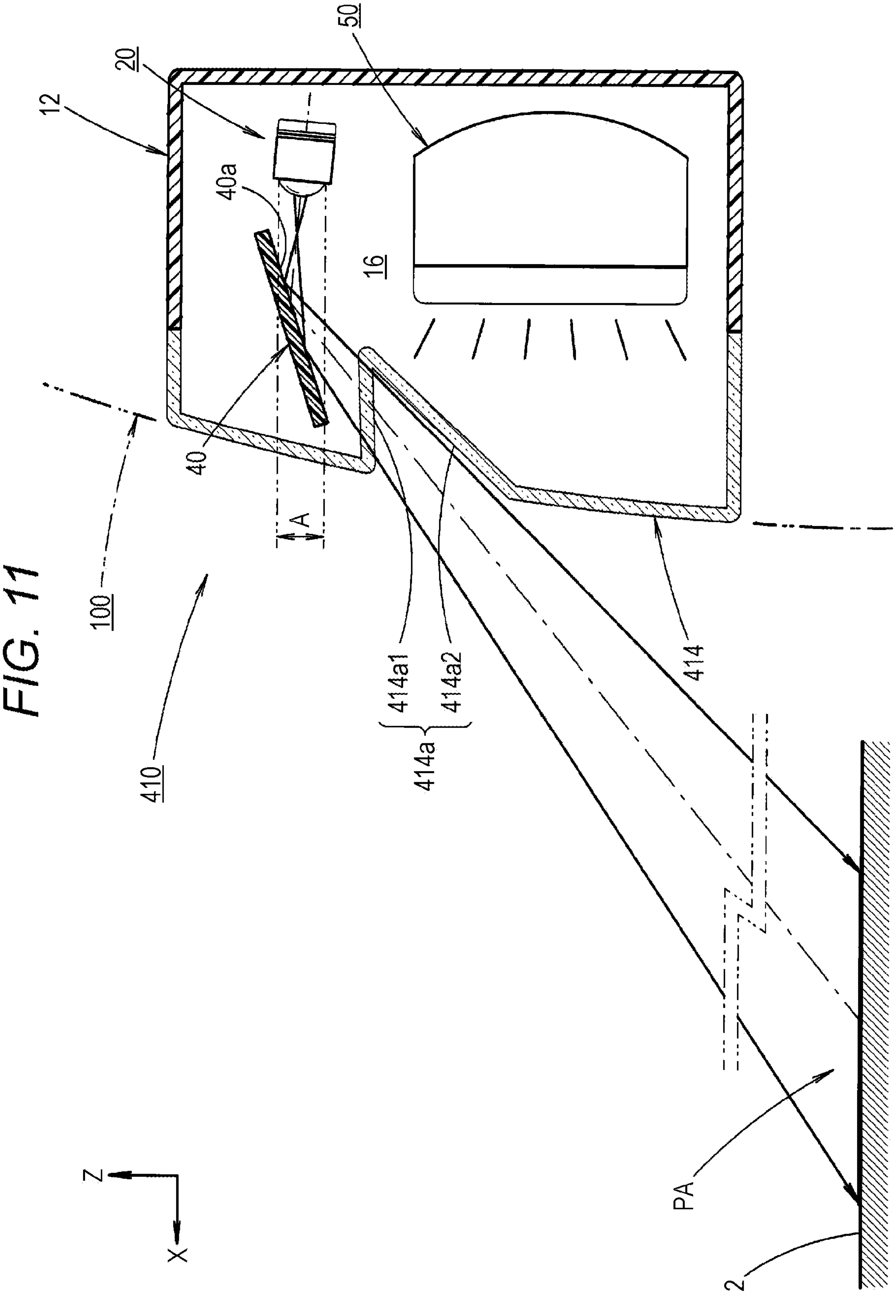
FIG. 11 is a view similar to FIG. 1, which shows a fourth modification of the embodiment.

FIG. 11 is a view similar to FIG. 1, which shows a drawing lamp 410 according to the present modification.

As shown in FIG. 11, a basic configuration of the present modification is similar to that of the above-described embodiment. However, part of the configuration of a translucent cover 414 is different from that of the above-described embodiment.

That is, of the translucent cover 414 of the present modification, a portion located lower than the reflecting mirror 40 is formed as a recessed portion 414*a* recessed to the lamp rear side. Then, the drawing light distribution pattern PA is formed on the lamp front road surface 2 by causing the reflected light from the reflecting mirror 40 to penetrate an upper region 414*a*1 of the recessed portion 414*a*.

The recessed portion 414*a* has a wedge-like vertical sectional shape, and the upper region 414*a*1 thereof is formed so as to extend in a flat plate shape in a direction slightly inclined obliquely upward to the lamp rear side with respect to the horizontal plane. A lower region 414*a*2 of the recessed portion 414*a* is formed at an inclination angle at which the reflected light from the reflecting mirror 40 does not enter.

With the configuration of the present modification, the following features and effects can be obtained.

That is, in a case where the surface of the translucent cover 414 is dirty, when the light emitted from the drawing unit 20 penetrates the translucent cover 414, scattered light is generated in such a transmission region, which may give unnecessary discomfort to the surroundings.

On the other hand, by adopting the configuration in which the recessed portion 414*a* is formed in the translucent cover 414 as in the present modification, dirt is less likely to adhere to the upper region 414*a*1. Thus, by adopting the configuration in which the reflected light from the reflecting mirror 40 penetrates the upper region 414*a*1 of the recessed portion 414*a*, it is possible to effectively reduce the generation of the scattered light and, as a result, to prevent unnecessary discomfort from being given to the surroundings.

Moreover, since the upper region 414*a*1 of the recessed portion 414*a* is formed in the flat plate shape, the light emitted from the drawing unit 20 can penetrate the translucent cover 414 as it is, whereby the drawing light distribution pattern PA can be accurately formed.

Further, since the upper region 414*a*1 of the recessed portion 414*a* extends in the direction slightly inclined obliquely upward to the lamp rear side with respect to the horizontal plane, it is possible to prevent the upper region 414*a*1 from being visually recognized from the front of the lamp and, as a result, to prevent the translucent cover 414 from being inadvertently illuminated by ON of the drawing unit 20.

Next, a fifth modification of the above-described embodiment will be described.

Figure 12:
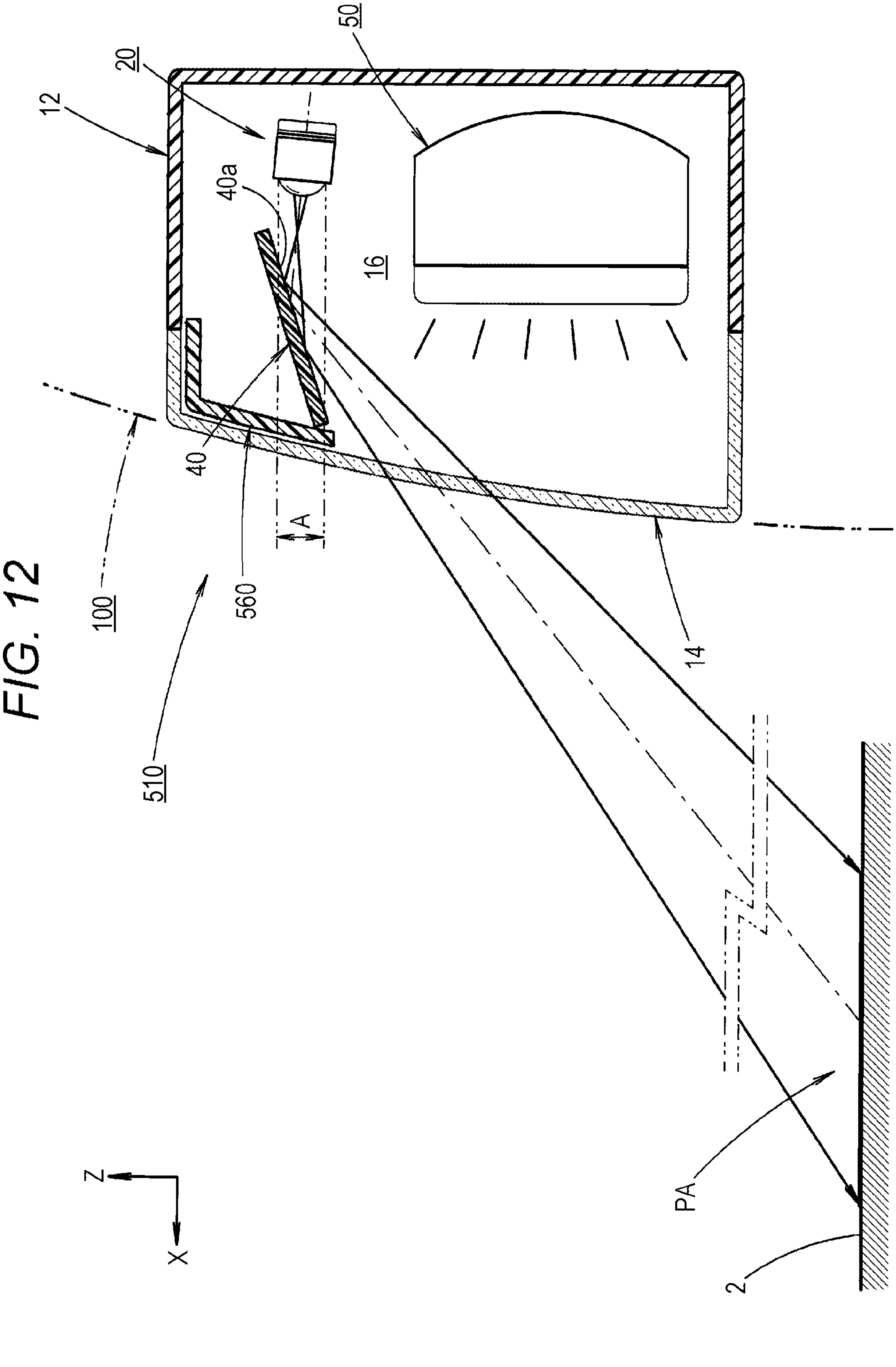
FIG. 12 is a view similar to FIG. 1, which shows a fifth modification of the embodiment.

FIG. 12 is a view similar to FIG. 1, which shows a drawing lamp 510 according to the present modification.

As shown in FIG. 12, a basic configuration of the present modification is similar to that of the above-described embodiment, but the present modification is different from the above-described embodiment in that an extension panel 560 is additionally disposed in the lamp chamber 16.

The extension panel 560 is disposed so as to extend along the translucent cover 14 between the reflecting mirror 40 and the translucent cover 14. The lower end surface of the extension panel 560 is located lower than the front end surface of the reflecting mirror 40, and the upper end surface thereof is located at a front end portion of the lamp body 12.

With the configuration of the present modification, the following features and effects can be obtained.

That is, when the drawing lamp 510 is OFF, it is possible to prevent the reflecting mirror 40 and the drawing unit 20 from being visually recognized via the translucent cover 14, whereby the appearance of the drawing lamp 510 can be improved. Further, when the drawing lamp 510 is ON, it is possible to more effectively reduce visual recognition of light emission from the drawing unit 20 itself.

Next, a sixth modification of the above-described embodiment will be described.

Figure 13:
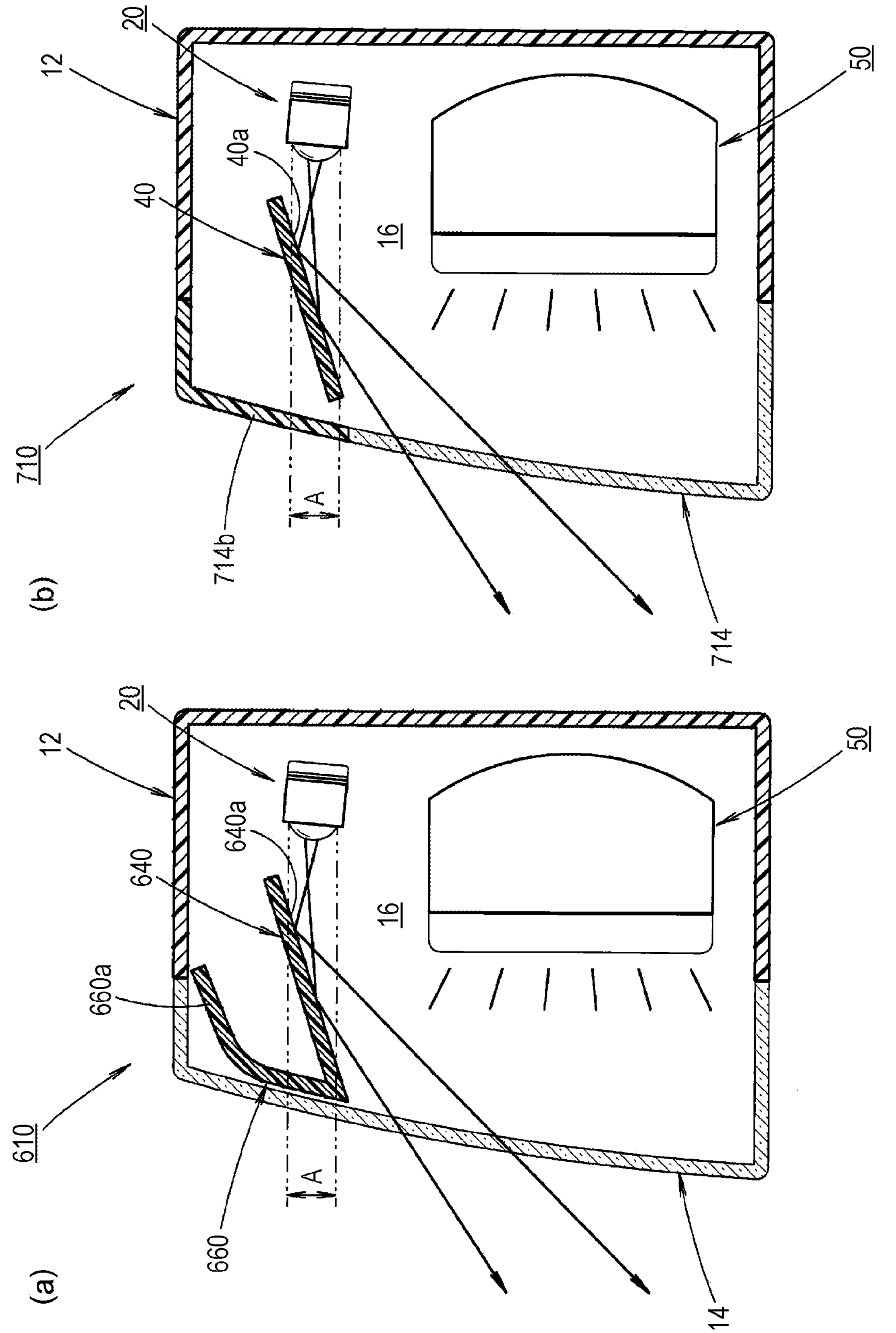
FIG. 13(*a*) is a view similar to FIG. 1, which shows a sixth modification of the embodiment, and FIG. 13(*b*) is a view similar to FIG. 1, which shows a seventh modification of the embodiment.

FIG. 13(*a*) is a view similar to FIG. 1, which shows a drawing lamp 610 according to the present modification.

As shown in FIG. 13(*a*), a basic configuration of the present modification is similar to that of the above-described embodiment, but the present modification is different from the above-described embodiment in that an extension panel 660 is additionally disposed in the lamp chamber 16.

As in the fifth modification above, the extension panel 660 is disposed so as to extend along the translucent cover 14 between a reflecting mirror 640 and the light translucent cover 14, but in the present modification, the extension panel 660 is integrally formed with the reflecting mirror 640.

That is, a front end portion of the reflecting mirror 640 and a lower end portion of the extension panel 660 are coupled in the vicinity of the translucent cover 14. An upper end portion 660*a* of the extension panel 660 extends at an inclination angle slightly upward from the reflecting mirror 640, and the upper end surface thereof is located at a front end portion of the lamp body 12.

Note that the reflecting mirror 640 is disposed in a state in which a reflecting surface 640*a* thereof extends obliquely upward to the lamp rear, as in the above-described embodiment.

In a case where the configuration of the present modification is adopted, when the drawing lamp 610 is OFF, it is possible to prevent the reflecting mirror 640 and the drawing unit 20 from being visually recognized via the translucent cover 14, whereby the appearance of the drawing lamp 610 can be improved, as in the case of the fifth modification above. Further, when the drawing lamp 610 is ON, it is possible to more effectively reduce visual recognition of light emission from the drawing unit 20 itself.

In addition, as in the present modification, by adopting the configuration in which the reflecting mirror 640 and the extension panel 660 are integrally formed, the above-described features and effects can be obtained without increasing the number of components.

Next, a seventh modification of the above-described embodiment will be described.

FIG. 13(*b*) is a view similar to FIG. 1, which shows a drawing lamp 710 according to the present modification.

As shown in FIG. 13(*b*), a basic configuration of the present modification is similar to that of the above-described embodiment. However, part of the configuration of a translucent cover 714 is different from that of the above-described embodiment.

That is, of the translucent cover 714 of the present modification, an upper region 714*b* located in the lamp front of the reflecting mirror 40 is formed of a two-color molded article made of opaque resin.

In a case where the configuration of the present modification is adopted, when the drawing lamp 710 is OFF, it is possible to prevent the reflecting mirror 40 and the drawing unit 20 from being visually recognized via the translucent cover 714, whereby the appearance of the drawing lamp 710 can be improved, as in the case of the fifth modification above. Further, when the drawing lamp 710 is ON, it is possible to more effectively reduce visual recognition of light emission from the drawing unit 20 itself. In addition, as in the present modification, by forming the translucent cover 714 from the two-color molded article, the above-described features and effects can be obtained without increasing the number of components.

Note that the numerical values indicated as the specifications in the above embodiment and the modifications thereof are merely examples, and naturally the numerical values may be set at different values as appropriate.

Moreover, the invention of the present application is not limited to the configurations described in the above embodiment and the modifications thereof, and it is possible to adopt a configuration to which various modifications are added other than the configurations described above.

The present international application claims priority based on Japanese Patent Application No. 2022-186955 filed on Nov. 22, 2022, and the entire contents of Japanese Patent Application No. 2022-186955 are incorporated herein by reference.

The description of the specific embodiments of the present invention is presented for the purpose of illustration. The specific embodiments are not intended to be exhaustive or to limit the invention as it is in the form described. It is obvious to those skilled in the art that many modifications and alterations are possible in light of the contents of the description above.

LIST OF REFERENCE SIGNS

2 Lamp Front Road Surface
10, 110, 210, 310, 410, 510, 610, 710 DRAWING LAMP
12 Lamp Body
14, 414, 714 Translucent Cover
16 Lamp Chamber
20 Drawing Unit
22 Light Emitting Element
24 Substrate
26 Projection Lens
28 Lens Holder
30 Heat Sink
32 Light Shielding Plate
32*a*, 342*a* Opening
34 Condenser Lens
40, 140, 240, 340, 640 Reflecting Mirror

40*a*, 140*a*, 240*a*, 340*a*, 640*a* Reflecting Surface
50 Front Turn Signal Lamp
100 Vehicle
140*a*1, 140*a*2, 140*a*3, 240*a*1, 240*a*2, 240*a*3 Reflecting Region
342 Frame
414*a* Recessed Portion
414*a*1, 714*b* Upper Region
414*a*2 Lower Region
560, 660 Extension Panel
660*a* Upper End Portion
A Light Emitting Region
Ax Optical Axis
Ax1 Axis
PA, PB, PBa, PBb, PBc, PC, PD Drawing Light Distribution Pattern

The invention claimed is:

1. A drawing lamp configured to form a drawing light distribution pattern on a lamp front road surface by emitting light from a drawing unit to a lamp front via a translucent cover, comprising:
- a reflecting mirror disposed between the drawing unit and the translucent cover to reflect the light from the drawing unit downward,
- wherein the reflecting mirror is disposed at a position overlapping with an entirety of a light emitting region of the drawing unit in an up-down direction such that the reflecting mirror conceals light emission from the drawing unit when viewed from a front of the lamp,
- wherein the reflecting mirror is disposed in a state in which a reflecting surface of the reflecting mirror extends obliquely upward to a lamp rear, and the reflecting surface is downward.

2. The drawing lamp according to claim 1, wherein
- a reflecting surface of the reflecting mirror is configured such that a plurality of reflecting regions is arranged side by side in a lamp front-rear direction, and
- the plurality of reflecting regions is set to have a smaller inclination angle with respect to a horizontal plane as the reflecting region is located on a lamp front side.

3. The drawing lamp according to claim 2, wherein the reflecting surface is formed such that an inclination angle gradually changes in a boundary region between the plurality of reflecting regions.

4. The drawing lamp according to claim 1, wherein the reflecting mirror is configured to be turnable about an axis extending in a horizontal direction.

5. The drawing lamp according to claim 4, wherein a frame for blocking part of reflected light from the reflecting mirror to regulate an irradiation area is formed at a front end portion of the reflecting mirror.

6. The drawing lamp according to claim 1, wherein the translucent cover is formed such that a portion located lower than the reflecting mirror is formed as a recessed portion recessed to a lamp rear side, and is configured to cause reflected light from the reflecting mirror to penetrate an upper region of the recessed portion.

7. The drawing lamp according to claim 6, wherein the upper region is formed in a flat plate shape.

8. The drawing lamp according to claim 1, wherein an extension panel is disposed between the reflecting mirror and the translucent cover.

9. The drawing lamp according to claim 8, wherein the reflecting mirror and the extension panel are integrally formed.

10. The drawing lamp according to claim 1, wherein a region of the translucent cover located in the lamp front of the reflecting mirror is formed of a two-color molded article made of opaque resin.

11. The drawing lamp according to claim 1, wherein an entirety of the reflecting mirror is disposed between a front end of the drawing unit and the translucent cover.

12. The drawing lamp according to claim 2, wherein a light reflected by the reflecting surface of the reflecting mirror forms a plurality of drawing light distribution patterns on the lamp front road surface.

13. The drawing lamp according to claim 5, wherein the frame is integrally formed with the reflecting mirror, and the frame is configured to turn together with the reflecting mirror.

14. The drawing lamp according to claim 6, wherein the recessed portion has a wedge vertical sectional shape,
- the upper region of the recessed portion is formed so as to extend in a flat plate shape in a direction inclined obliquely upward to the lamp rear side with respect to a horizontal plane, and
- a lower region of the recessed portion is formed at an inclination angle at which the reflected light from the reflecting mirror does not enter.

15. The drawing lamp according to claim 9, wherein a front end portion of the reflecting mirror and a lower end portion of the extension panel are coupled in the vicinity of the translucent cover.

* * * * *